United States Patent [19]

Meltsner

[11] 3,717,610

[45] Feb. 20, 1973

[54] STABILIZATION OF POLYOLEFINS AND RUBBERS WITH A PHENOLIC PHOSPHATE

[75] Inventor: Bernard R. Meltsner, Royal Oak, Mich.

[73] Assignee: Ethyl Corporation, New York, N.Y.

[22] Filed: March 17, 1969

[21] Appl. No.: 807,968

Related U.S. Application Data

[62] Division of Ser. No. 505,982, Nov. 1, 1965.

[52] U.S. Cl......260/45.95, 260/45.7 P, 260/45.85 S, 260/953
[51] Int. Cl................................................C08f 45/58
[58] Field of Search........260/45.95, 45.7 P, 45.85 S, 260/953

[56] References Cited

UNITED STATES PATENTS

| 3,261,804 | 7/1966 | Graham | 260/45.7 |
| 3,406,146 | 10/1968 | Ley et al. | 260/45.95 |
| 3,414,639 | 12/1968 | Hodan et al. | 260/45.7 |
| 3,361,846 | 1/1968 | Gleim | 260/45.95 |

*Primary Examiner*—Donald E. Ozaja
*Assistant Examiner*—Eugene C. Rzucidlo
*Attorney*—Donald L. Johnson

[57] ABSTRACT

Organic material is stabilized by the addition of a tris(3,5-dihydrocarbyl-4-hydroxyphenyl)phosphate, either alone or in combination with a dialkylthiodialkanoate.

22 Claims, No Drawings

STABILIZATION OF POLYOLEFINS AND RUBBERS WITH A PHENOLIC PHOSPHATE

This application is a division of application Ser. No. 505,982, filed Nov. 1, 1965.

This invention relates to new 3,5-dihydrocarbyl-4-hydroxyphenyl phosphates and their use as antioxidants.

Most organic materials undergo degradation in the presence of oxygen. This degradation is accelerated at increased temperatures. Frequently, high temperatures are encountered during the processing of these materials in manufacturing operations and thus some form of stabilizer is required for many materials, even during the manufacturing stage. Other materials are not subject to extremes in temperature during manufacture, but even these undergo degradation on aging.

An object of this invention is to provide an additive capable of preventing degradation of organic materials due to oxygen. A further object of this invention is to provide organic materials that are stable against the effects of elevated temperatures during manufacture and also stable during long periods of aging under use conditions. A particular object is to provide a polyolefin (e.g., polypropylene) of exceptional high-temperature stability and capable of resisting degradation due to oxygen during long periods of use. Other objects will become apparent from the following description of the invention.

The above and other objects are accomplished by providing as a new composition of matter tris(3,5-dihydrocarbyl-4-hydroxy-phenyl)phosphates. These new compounds have the formula:

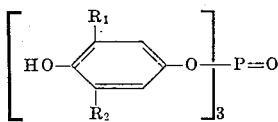

wherein $R_1$ is selected from the group consisting of alpha-branched alkyl radicals containing from three to 18 carbon atoms, alpha-branched aralkyl radicals containing from eight to 18 carbon atoms and cycloalkyl radicals containing from six to 18 carbon atoms; and $R_2$ is selected from the group consisting of alkyl radicals containing from one to 18 carbon atoms, aralkyl radicals containing from seven to 18 carbon atoms, aryl radicals containing from six to 18 carbon atoms and cycloalkyl radicals containing from six to 18 carbon atoms.

The following compounds serve to illustrate these new phosphates.

tris(3-methyl-5-tert-butyl-4-hydroxyphenyl)phosphate
tris(3-ethyl-5-isopropyl-4-hydroxyphenyl)phosphate
tris(3-methyl-5-cyclohexyl-4-hydroxyphenyl)phosphate
tris(3-n-propyl-5-(α-methylbenzyl)-4-hydroxyphenyl)phosphate
tris(3-methyl-5-(α-methylbenzyl)-4-hydroxyphenyl)phosphate
tris(3-methyl-5-(α, α-dimethylbenzyl)-4-hydroxyphenyl)phosphate
tris(3-phenyl-5-tert-butyl-4-hydroxyphenyl)phosphate In a preferred embodiment of this invention both $R_1$ and $R_2$ are alpha-branched hydrocarbyl radicals. Some representative examples of these compounds are:

tris(3,5-diisopropyl-4-hydroxyphenyl)phosphate
tris(3,5-dicyclohexyl-4-hydroxyphenyl)phosphate
tris(3,5-di-sec-butyl-4-hydroxyphenyl)phosphate
tris(3-isopropyl-5-tert-butyl-4-hydroxyphenyl)phosphate
tris(3-tert-butyl-5-(α-methylbenzyl)-4-hydroxyphenyl)phosphate
tris(3-tert-butyl-5-cyclohexyl-4-hydroxyphenyl)phosphate
tris(3-tert-dodecyl-5-sec-octadecyl-4-hydroxyphenyl)phosphate
tris(3-tert-nonyl-5-sec-octyl-4-hydroxyphenyl)phosphate In a more preferred embodiment of this invention both $R_1$ and $R_2$ are tertiary alkyl radicals. These may be illustrated by the following compounds:

tris(3,5-di-tert-amyl-4-hydroxyphenyl)phosphate
tris(3,5-di-tert-octyl-4-hydroxyphenyl)phosphate
tris(3,5-di-tert-dodecyl-4-hydroxyphenyl)phosphate
tris(3,5-di-tert-octadecyl-4-hydroxyphenyl)phosphate
tris(3,5-di-(α, α-dimethylbenzyl)-4-hydroxyphenyl)phosphate
tris(3-tert-butyl-5-tert-octyl-4-hydroxyphenyl)phosphate
tris(3-tert-butyl-5-(α, α-dimethylbenzyl)-4-hydroxyphenyl)-phosphate
tris(3-tert-amyl-5-tert-octadecyl-4-hydroxyphenyl)phosphate In a most preferred embodiment of this invention the tris(3,5-dihydrocarbyl-4-hydroxyphenyl)phosphate is tris(3,5-di-tert-butyl-4-hydroxyphenyl)phosphate.

In the foregoing description many of the preferred $R_1$ and $R_2$ radicals are referred to as "alpha-branched radicals." These are radicals wherein the carbon atom through which the radical bonds to the benzene ring is also bonded to at least two carbon atoms other than the carbon atom in the benzene ring. In other words, alpha-branched radicals are those commonly referred to as secondary or tertiary radicals such as the isopropyl and tert-butyl radicals.

The additive compounds of this invention are readily prepared by reacting a 2,6-dihydrocarbyl-p-hydroquinone with a phosphorus oxyhalide. Although any of the phosphorus oxyhalides may be employed, the preferred reactants are phosphorus oxybromide and phosphorus oxychloride and especially phosphorus oxychloride because of its low cost, availability and excellent results obtained with its use.

The 2,6-dihydrocarbyl-p-hydroquinones can be prepared by any of the methods available in the art such as the oxidation of the corresponding 2,6-dihydrocarbyl-p-aminophenol to the 2,6-dihydrocarbyl-benzoquinone followed by reduction to the 2,6-dihydrocarbyl-p-hydroquinone. An especially useful method for preparing the preferred hydroquinones is through the air oxidation of the proper 2,6-di-tert-alkyl-4-tert-butylphenol. The air oxidation of such compounds leads to 2,6-di-tert-alkyl-p-benzoquinones which are readily converted to the corresponding hydroquinone by reduction. This method is described in detail in U.S. Pat. No. 3,213,114.

The stoichiometry of the reaction requires three moles of the 2,6-dihydrocarbyl-p-hydroquinone per mole of phosphorus oxyhalide. Slightly more or slightly less of the hydroquinone can be employed. A preferred range is from about 2.8 to 3.1 moles per mole of phosphorus oxyhalide. A most preferred range is from about 2.9 to 3 moles of 2,6-dihydrocarbyl-p-hydroquinone per mole of phosphorus oxyhalide.

The reaction between the hydroquinone and the phosphorus oxychloride can be conducted by adding the phosphorus oxychloride to the hydroquinone or by adding the hydroquinone to the phosphorus oxychloride. The preferred method is to add the phosphorus oxychloride to the hydroquinone in a mole ratio of about 1 mole of phosphorus oxychloride to 3 moles of the hydroquinone, thus avoiding any excess of phosphorus oxychloride which might undergo undesirable side reactions with the tris(3,5-dihydrocarbyl-4-hydroxyphenyl)-phosphate by way of chlorinating the phosphate or reacting with the hydroxyl substituent on the phosphate.

The reaction may be conducted in the presence or absence of a solvent. Usually it is preferred to employ a solvent because this makes it easier to moderate the reaction and also to purify the product. Preferred solvents are those in which the reactants are soluble and which are inert to the reactants or products under the reaction conditions. Some examples of these are ethers such as diethyl ether, ethyl butyl ether, di-n-propyl ether, ethylene glycol diethyl ether, diethyleneglycol dimethyl ether, and the like; esters such as ethyl acetate, amyl acetate, ethyl butyrate, and the like; and hydrocarbons such as hexane, heptane, isooctane, kerosene, petroleum ether (mixtures of low boiling hydrocarbons), mineral spirits, and the like. The more preferred solvents are hydrocarbons having a boiling point of from about 50° to about 200° C. Still more preferred hydrocarbon solvents are the aromatic hydrocarbons having a boiling point of from about 80° to about 200° C. Some examples of highly preferred solvents are toluene and xylene.

The reaction should be conducted at a temperature high enough so that the reaction proceeds at a reasonable rate, but not so high as to cause degradation of the product. A preferred temperature range is from about zero degrees up to about 200° C, and a most preferred temperature range is from about 20° to 30° C.

The reaction involves the evolution of a hydrogen halide, for example, HCl, and thus can be conducted in the presence of a hydrogen halide acceptor. Especially suitable hydrogen halide acceptors are the tertiary amines such as pyridine or triethylamine.

The reaction may be conducted in the presence of air, although it is usually preferred to carry the reaction out under a relatively inert atmosphere. An inert atmosphere removes the danger of explosions, minimizes the danger of solvent vapor explosions and lessens the likelihood of contaminating the product through oxidation. Although the process can be conducted at temperatures both below and above atmospheric pressure it is normally conducted at atmospheric pressure.

The addition of the phosphorus oxyhalide to the 2,6-dihydrocarbyl-p-hydroquinone usually takes from about 15 minutes to several hours, depending upon the size of the reaction and the efficiency of heat removal. The addition time is not critical and can be carried out at as high a rate as permitted by the cooling means available. Under normal conditions the addition is readily completed in from about 30 minutes to an hour. Preferably, the reaction is stirred at the reaction temperature for a short period following the completion of the addition of the reactants. Under most circumstances the reaction is complete in from about 0.5 to 8 hours following completion of addition. A preferred reaction time is from about one to 4 hours, and a most preferred reaction time is from about 2 to 3 hours.

The product may be recovered by any of the means known to those skilled in the art. One useful method employed when a tertiary amine hydrogen halide acceptor is employed is to first filter off the tertiary amine hydrogen halide complex, following which all solvent is distilled from the filtrate, leaving a semi-liquid residue. This residue is then dissolved in a hot aliphatic hydrocarbon such as hexane and, upon cooling, the tris(3,5-di-hydrocarbyl-4-hydroxyphenyl)phosphate will crystallize in high purity and good yield.

When the reaction is conducted without an amine hydrogen halide acceptor, the reaction mass can be merely washed with water at the end of the reaction period to remove any residual hydrogen halide. It is then preferably washed with a slightly basic solution (e.g., dilute $Na_2CO_3$ solution) to neutralize any remaining acid.

When a high purity product is not required the product can be recovered by merely evaporating any solvent employed and using the residue as is. In still another embodiment the solution of the stabilizer may be used directly in blending with the organic materials requiring stabilization. Thus, when the reaction is conducted in a toluene solvent, the toluene solution of the stabilizer may be washed and neutralized to remove acidic material and then sprayed directly onto, for example, bulk polypropylene. The solvent is then evaporated off and the bulk polypropylene is ready for processing (e.g., molding, extrusion, and the like).

The following examples will serve to illustrate the preparation of the additive compounds of the present invention. All parts are parts by weight unless otherwise specified.

EXAMPLE 1

To a reaction vessel fitted with stirrer, thermometer, liquid addition means and cooling means was added 8.6 parts of 2,6-di-tert-butyl-p-hydroquinone, 3.9 parts of triethylamine and 70 parts of diethyl ether. The vapor space above the liquid reactants was displaced with a nitrogen atmosphere which was maintained during the remainder of the reaction. A solution of 1.99 parts of phosphorus oxychloride in 18 parts of diethyl ether was added to the reaction vessel while stirring. The reaction temperature was maintained at about 30° C during this addition. The reaction was then stirred for about 12 hours, during which period a triethylamine hydrochloride precipitate formed. This precipitate was filtered off and the ether solvent was then removed from the filtrate by evaporation under vacuum (about 20 mm Hg). The residue remaining was recrystallized from a methanol water mixture, giving white crystals having a melting point of 201°–4°C. The infrared spectrum was consistent with that for tris(3,5-di-tert-butyl- 4-hydroxyphenyl)phosphate. Analysis for carbon, hydrogen and phosphorus was carried out. The calculated analysis for tris(3,5-di-tert-butyl-4-hydroxyphenyl)phosphate is C, 70.96%; H, 8.93% and P, 4.36%. Found was C, 70.8%; H, 8.94% and P, 4.7%. Thus, the product was identified as tris(3,5-di-tert-butyl-4-hydroxyphenyl)-phosphate.

EXAMPLE 2

To a reaction vessel equipped as in Example 1 is added 667 parts of 2,6-di-tert-butyl-p-hydroquinone and 1,500 parts of toluene. Nitrogen is passed through the vessel until all air has been removed and a nitrogen atmosphere is maintained throughout the remainder of the reaction. While stirring, the vessel contents are heated to the reflux temperature of the solvent. While maintaining the reaction at reflux, 153.5 parts of phosphorus oxychloride are fed over a one hour period. Cooling is effected by reflux of the solvent. Following the phosphorus oxychloride addition, the reaction is refluxed for one additional hour. It is then allowed to cool and immediately upon dropping below 90°C, 1,000 parts of water are added to the reaction vessel and the mixture stirred for 15 minutes. The water is drained off and the reactants are then washed with 1,000 parts of a 5 percent sodium carbonate solution. This solution is drained off and the toluene solvent is then removed by reducing the pressure in the reaction vessel to 50 mm and slowly distilling out the toluene until the reaction vessel contents reach 150°C. The remaining material is dissolved in a minimum amount of hot hexane and the hexane solution is then cooled to 0°C, causing the product to precipitate, forming a slurry. The reaction mass is then filtered and the product, tris(3,5-di-tert-butyl-4-hydroxyphenyl)phosphate, is obtained.

EXAMPLE 5

To a reaction vessel equipped as in Example 1 is added 954 parts of 2,6-di($\alpha$-methylbenzyl)-p-hydroquinone and 3,000 parts of xylene. While stirring, 156 parts of phosphorus oxychloride are added over a period of 4 hours while maintaining the reaction temperature at 30°C through external cooling. Following the phosphorus oxychloride addition, the reaction contents are stirred for 7 additional hours at 30°C and then the temperature is slowly raised to 100°C during an additional 1 hour period. The reaction mass is then cooled and washed twice with 1,000 parts of water each. The reaction mass is then treated with 1,000 parts of a 5 percent sodium carbonate solution. Following this, the xylene solvent is removed by distilling out the solvent at 30 mm of pressure until the reaction vessel attains a temperature of 150°C. The residue is recrystallized from a minimum quantity of petroleum ether (b.p. 60° –70°C), yielding tris(3,5-di-($\alpha$-methylbenzyl)-4-hydroxyphenyl)-phosphate.

In the above example equal mole quantities of other 2,6-dihydrocarbyl-p-hydroquinones can be employed to give the corresponding tris(3,5-dihydrocarbyl-4-hydroxyphenyl)phosphate. For example, the use of 2,6-diisopropyl-p-hydroquinone yields tris(3,5-diisopropyl-4-hydroxyphenyl)phosphate. The use of 2,6-di-sec-butyl-p-hydroquinone yields tris(3,5-di-sec-butyl-4-hydroxyphenyl)phosphate. The use of 2,6-di-tert-octyl-p-hydroquinone yields tris(3,5-di-tert-octyl-4-hydroxyphenyl)phosphate. The use of 2,6-dicyclohexyl-p-hydroquinone yields tris(3,5-dicyclohexyl-4-hydroxyphenyl)phosphate. The use of 2,6-di-tert-octadecyl-p-hydroquinone yields tris(3,5-di-tert-octadecyl-4-hydroxyphenyl)phosphate. The use of 2-methyl-6-($\alpha$,$\alpha$-dimethylbenzyl)-p-hydroquinone yields tris[3-methyl-5-($\alpha$,$\alpha$-dimethylbenzyl)-4-hydroxyphenyl]phosphate. The use of 2-(2,4-di-tert-butylphenyl)-6-tert-dodecyl-p-hydroquinone yields tris [3-(2,4-di-tert-butylphenyl)-5-tert-dodecyl-4-hydroxyphenyl] phosphate.

In like manner, equal mole quantities of other phosphorous oxyhalides can be used, such as phosphorus oxybromide, with good results.

The compounds of this invention are extremely useful as antioxidants in a wide variety of organic material normally susceptible to deterioration in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene and iron carbonyl have appreciably increased stability when treated with the additives of this invention. Furthermore, lubricating oils and functional fluids, both those derived from naturally occurring hydrocarbons and those synthetically prepared, have greatly enhanced stability by the practice of this invention. The additives of this invention are extremely useful in stabilizing antiknock fluids against oxidative degradation. For example, the stabilizing additives of this invention find utility in stabilizing a tetraethyl-lead antiknock fluid which contains ethylenedichloride and ethylenedibromide.

The additives of this invention are effective in stabilizing rubber against degradation caused by oxygen or ozone. As used in the description and claims, the term "rubber" is employed in a generic sense to define a high molecular weight plastic material which possesses high extensibility under load coupled with the property of forcibly retracting to approximately its original size and shape after the load is removed. Some examples are acrylic rubber, butadiene-styrene rubber (SBR), chloroprene, chlorosulfonated polyethylene, fluorocarbon rubbers, isobutylene-isoprene (IIR), isoprene, butadiene, nitrile-butadiene rubber, polyisobutylene rubber, polysulfide rubbers, silicone rubbers, urethanes, India rubber, reclaimed rubber, balata rubber, gutta percha rubber, and the like. Both natural rubber and synthetic rubbers such as neoprene, SBR rubber, EPT rubber, GR-N rubber, chloroprene rubber, polyisoprene rubber, EPR rubber, and the like, are greatly stabilized through the practice of this invention.

The compounds of this invention are also useful in protecting petroleum wax against degradation. The additives also find use in the stabilization of fats and oils of animal and vegetable origin which tend to become rancid during long periods of storage because of oxidative deterioration. Typical representatives of these edible fats and oils are linseed oil, cod liver oil, castor oil, soy bean oil, rapeseed oil, coconut oil, olive oil, palm oil, corn oil, sesame oil, peanut oil, babassu oil, butter, lard, beef tallow, and the like.

The compounds of this invention are superior antioxidants for high molecular weight polyolefins such as polyethylene (both high pressure and so-called Ziegler type polyethylene), polybutene, polybutadiene (both cis and trans), and the like.

One of the features of the present stabilizers is that they do not cause discoloration when used in transparent, white, or light-colored organic materials such as white rubber or plastics such as polyethylene, polypropylene, and the like.

The amount of stabilizer used in the organic compositions of this invention is not critical, as long as a stabilizing quantity is present, and can vary from as little as 0.001 weight percent to about 5 weight percent. Generally, excellent results are obtained when from 0.1 to about 3 weight percent of the stabilizer is included in the organic compositions.

The following examples serve to illustrate the use of the stabilizers of the present invention in stabilizing some representative organic materials normally subject to deterioration in the presence of oxygen or ozone.

EXAMPLE 4

A rubber stock is prepared containing the following components:

| Component | Parts |
| --- | --- |
| pale crepe rubber | 100 |
| zinc oxide filler | 50 |
| titanium dioxide | 25 |
| stearic acid | 2 |
| ultramarine blue | 0.12 |
| sulfur | 3.00 |
| mercaptobenzothiazole | 1.00 |

To the above base formula is added one part by weight of tris(3,5-di-tert-butyl-4-hydroxyphenyl)phosphate and, following this, individual samples are cured for 20, 30, 45 and 60 minutes, respectively, at 274°C. After cure, all of these samples remain white in color and possess excellent tensile strength. Furthermore, they are resistant to degradation caused by either oxygen or ozone on aging.

EXAMPLE 5

A synthetic rubber master batch comprising 100 parts of GR-S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is prepared. To this is added 1.5 parts of tris(3,5-($\alpha$-methylbenzyl)-4-hydroxyphenyl)phosphate. This composition is then cured for 60 minutes employing 45 psig of steam pressure. The resulting synthetic rubber possesses resistance to oxygen and ozone induced degradation.

EXAMPLE 6

A butadiene acrylonitrile copolymer is prepared from 68 per cent 1,3-butadiene and 32 percent acrylonitrile. Two per cent, based on the weight of the copolymer, of tris(3,5-diisopropyl-4-hydroxyphenyl)phosphate is added as an aqueous emulsion to the latex obtained from emulsion copolymerization of the butadiene and acrylonitrile monomers. The latex is coagulated with aluminum sulfate and the coagulum, after washing, is dried for 20 hours at 70°C. The synthetic copolymer so obtained is resistant to oxidative degradation.

EXAMPLE 7

Three percent of tris(3,5-di-tert-octyl-4-hydroxyphenyl) phosphate as an emulsion in sodium oleate is added to a rubber-like copolymer of 1,3-butadiene and styrene containing 25 percent styrene. The resulting synthetic elastomer possesses enhanced stability.

EXAMPLE 8

To a master batch of GR-N synthetic rubber containing 100 parts of GR-N rubber, 5 parts of zinc stearate, 50 parts of carbon black, 5 parts of road tar, 2 parts of sulfur and 2 parts of mercaptobenzothiazole is added 5 percent, based on weight, of tris(3,5-di-sec-butyl-4-hydroxyphenyl)phosphate. After curing, a synthetic rubber is obtained of improved oxidative stability.

EXAMPLE 9

To a master batch of polyethylene having an average molecular weight of 1,000,000, a tensile strength of 6,700 psi, a Shore D hardness of 74 and a softening temperature under low load of 150°C is added 5 percent of tris(3,5-di-tert-butyl-4-hydroxyphenyl)phosphate. The resulting polyethylene possesses stability against oxidative degradation and shows no tendency to yellow after extensive aging.

EXAMPLE 10

A linear polyethylene having a high degree of crystallinity (93 percent), and less than one branched chain per 100 carbon atoms, a density of about 0.96 grams per ml and which has about 1.5 double bonds per 100 carbon atoms, is mixed with 0.005 weight percent of tris(3,5-dicyclohexyl-4-hydroxyphenyl)phosphate. The resulting polyethylene is found to possess stability against oxidative degradation.

EXAMPLE 11

To 100 parts of an ethylenepropylene terpolymer is added 3 parts of tris(3-tert-amyl-5-tert-octyl-4-hydroxyphenyl)phosphate, resulting in an ethylenepropylene terpolymer of enhanced stability.

EXAMPLE 12

To 100 parts of an ethylenepropylene rubber is added 2 parts of tris(3-tert-nonyl-5-sec-octyl-4-hydroxyphenyl)phosphate, resulting in an EPR rubber stock of improved stability.

EXAMPLE 13

After the polymerization of polypropylene in a hexane solvent employing a Ziegler catalyst, the catalyst is neutralized with water and tris(3,5-di-tert-butyl-4-hydroxyphenyl)phosphate is added to the mixture in quantities such that, after evaporation of the solvent, a Ziegler polypropylene is obtained containing 2 per cent of tris(3,5-di-tert-butyl-4-hydroxyphenyl)phosphate. This polypropylene is found to possess excellent stability against degradation caused by oxygen or ozone. Furthermore, this polypropylene is found to resist degradation at elevated temperatures, even in the presence of oxygen. During this high temperature aging the Ziegler polypropylene shows no tendency to discolor.

EXAMPLE 14

To 1,000 parts of a gasoline containing 26.6 percent aromatics, 20.8 percent olefins, 52.6 percent saturates and having an API gravity of 62.1 is added 10 parts of tris(3-tert-butyl-5-cyclohexyl-4-hydroxyphenyl)phosphate. The resulting gasoline is stable.

EXAMPLE 15

To 10,000 parts of gasoline containing 8.6 percent aromatics, 7.9 percent olefins, 83.5 percent saturates and having an API gravity of 68.5 is added 200 parts of tris(3-methyl-5-cyclohexyl-4-hydroxyphenyl)phosphate. The resulting gasoline is stable against oxidative degradation.

EXAMPLE 16

To 10,000 parts of a gasoline containing 20.0 per cent aromatics, 41.2 percent olefins, 38.8 per cent saturates and containing additionally 1.5 grams of manganese per gallon as methyl cyclopentadienyl manganese tricarbonyl is added 300 parts of tris-(3-phenyl-5-tert-butyl-4-hydroxyphenyl)phosphate. The resulting gasoline containing a manganese antiknock was resistant to oxidative degradation.

EXAMPLE 17

To 10,000 parts of a gasoline containing 20.5 percent aromatics, 32.9 percent olefins and 46.6 percent saturates and containing 2.39 grams per gallon of tetraethyllead and one theory of chlorine as ethylenedichloride and 0.5 theory of bromine as ethylenedibromide is added 500 parts of tris(3,5-di-tert-butyl-4-hydroxyphenyl)phosphate. The resulting gasoline containing a lead antiknock and halogen scavenger is resistant to oxidative degradation. Not only this, but it is also found when used to give prolonged spark plug life due to the presence of the phosphorus containing antioxidant.

EXAMPLE 18

To 10,000 parts of gasoline containing 38.1 percent aromatics, 7.3 percent olefins and 54.6 percent saturates and which contains 3.17 grams per gallon of lead as tetramethyllead, one theory of chlorine as ethylenedichloride, 0.5 theory of bromine as ethylenedibromide and 0.2 theory of phosphorus as tris($\beta$-chloro-isopropyl)thionophosphate is added 50 parts of tris[3-tert-butyl-5-($\alpha,\alpha$-dimethylbenzyl)-4-hydroxyphenyl]phosphate. The resulting gasoline is resistant to degradation and gives prolonged spark plug life on use.

EXAMPLE 19

An antiknock fluid composition is prepared by mixing together 61.5 parts of tetraethyllead, 17.9 parts of ethylenedibromide, 18.8 parts of ethylenedichloride and 1.3 parts of tris-(3,5-di-tert-butyl-4-hydroxyphenyl)phosphate, resulting in a stable antiknock fluid composition.

EXAMPLE 20

To 1,000 parts of a commercial diesel fuel having a cetane number of 42, is added 5 parts of amyl nitrate and 4 parts of tris[3-n-propyl-5-($\alpha$-methylbenzyl)-4-hydroxyphenyl]phosphate, resulting in a diesel fuel of high resistance to oxidative deterioration which does not form gum or sludge on storage.

EXAMPLE 21

To 1,000 parts of a solvent refined neutral oil (95 viscosity index and 200 SUS at 100°F) containing 6 percent of a commercial merthacrylate type B-1 improver is added 5 percent of tris[3,5-di-($\alpha$-methylbenzyl)-4-hydroxyphenyl]phosphate, resulting in a stable lubricating oil.

EXAMPLE 22

To a solvent refined crankcase lubricating oil having a viscosity index of 95 and a SAE viscosity of 10 is added 0.1 percent of tris(3,5-di-tert-dodecyl-4-hydroxyphenyl)phosphate. The resulting oil was stable against oxidative degradation.

EXAMPLE 23

To 100,000 parts of a petroleum hydrocarbon oil having a gravity of 30.3° API at 60°F, viscosity of 178.8 SUS at 100°F, a viscosity index of 154.2, and containing 1,000 parts of the reaction product of an alkenyl succinic anhydride where the alkenyl group has a molecular weight of 2,000, with a polyethylene amine, is added 200 parts of tris(3-tert-amyl-5-tert-octadecyl-4-hydroxyphenyl)phosphate. The resulting lubricating oil possesses excellent dispersancy and is resistant to oxidative degradation.

EXAMPLE 24

To 100,000 parts of a commercially available pentaerythritol ester having a viscosity at 100°F of 22.4 centistokes and known under the tradename of "Hercoflex 600" is added 400 parts of tris(3,5-di-cyclohexyl-4-hydroxyphenyl)phosphate. The resulting synthetic lubricating oil possesses improved resistance against oxidative deterioration.

EXAMPLE 25

To 100,000 parts of dioctyl sebacate having a viscosity at 210°F of 36.7 SUS, a viscosity index of 159, and a molecular weight of 427, is added 250 parts of tris(3-phenyl-5-tert-butyl-4-hydroxyphenyl)phosphate, resulting in a synthetic diester lubricating oil having improved resistance to oxidative degradation.

EXAMPLE 26

To 1,000 parts of a commercial coconut oil is added 5 parts of tris[3-tert-butyl-5-($\alpha$-methylbenzyl)-4-hydroxyphenyl]-phosphate, resulting in a vegetable oil with good aging characteristics.

EXAMPLE 27

To 100,000 parts of lard is added 100 parts of tris(3-tert-butyl-5-cyclohexyl-4-hydroxyphenyl)phosphate, resulting in a lard having resistance to rancidity.

The stabilizing additives of this invention are eminently useful as stabilizers in polyolefins such as polyethylene, polypropylene, and the like. In this use they function as antioxidants, antiozonants and also as thermal stabilizers. They are extremely long lasting and highly resistant to the formation of color.

In order to demonstrate their vastly superior stabilization effect tests were conducted using a commercial polypropylene. These tests are known as "Oven Aging Tests" and are recognized in the plastic industry as an accurate guide to oxidative stability. In these tests small specimens of polypropylene are prepared containing the test stabilizer. These test specimens are placed in an air circulating oven maintained at 150°C. Five replicates are made of each polypropylene-stabilizer composition and the test criteria is the time and hours until three of the five replicates show signs of deterioration. Deterioration is evidenced by cracking, discoloration or any visual appearance of change in the specimen.

Test specimens are prepared by mixing the test stabilizers with polypropylene powder for 3 minutes in a Waring Blender. The mixture is then molded into a 6 × 6 inch sheet with a thickness of either 0.025 or 0.0625 inch. This is accomplished in a molding press at 400°F under 5,000 psi pressure. Each sheet is then cut into ½ × 1 inch test specimens in order to obtain the five replicate samples. These samples are then subjected to the Oven Aging Tests.

In order to compare the stabilizing additives of this invention tests were carried out employing several commercially accepted stabilizers along with the preferred stabilizer of the present invention. The results obtained are shown in the following table.

| Additive | Conc. (Wt. %) | Sample Thickness | Hours to Failure |
|---|---|---|---|
| None | | 25 mil | 2.5 |
| 2,6-di-tert-butyl-4-methylphenol | 0.3 | 25 mil | 16 |
| 2,2'-methylenebis-(4-methyl-6-tert-butylphenol) | 0.3 | 25 mil | 112 |
| 4,4'-thiobis(2-tert-butyl-5-methylphenol) | 0.3 | 25 mil | 96 |
| tris(3,5-di-tert-butyl-4-hydroxyphenyl)phosphate | 0.3 | 25 mil | 1648 |
| tris(3,5-di-tert-butyl-4-hydroxyphenyl)phosphate | 0.3 | 62 mil | 1768 |

As the above table shows, the additive of the present invention increased the oven life of the polypropylene almost 700 times that obtained without any additive, and about 17 times as much as the life obtained with two commercially accepted antioxidants. Thus, it can be seen that the additives of the present invention are vastly superior to stabilizers available in the prior art.

The effectiveness of the present stabilizers can be enhanced still further by employing synergistic mixtures of the stabilizers of this invention. The preferred synergists are those having the formula:

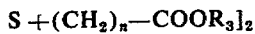

wherein $n$ is an integer from 1 to 5, and $R_3$ is selected from the group consisting of alkyl radicals containing from one to 20 carbon atoms, aryl radicals containing from six to 20 carbon atoms, aralkyl radicals containing from seven to 20 carbon atoms and cycloalkyl radicals containing from six to 20 carbon atoms. In the preferred synergist $n$ is an integer from 1 to 3 and R is selected from the group consisting of alkyl radicals containing from 10 to 18 carbon atoms. The most preferred synergists are dilaurylthiodipropionate and distearylthiodipropionate.

The ratio of synergist to stabilizing compound should be adjusted to give the desired protection at the least cost. Mixtures containing from 1 percent synergist and 99 percent stabilizer to those containing 99 percent synergist and 1 percent stabilizer can be employed. Best results are usually obtained with stabilizing mixtures containing from 50 to 66 percent synergist and from 34 to 50 percent stabilizing compound.

The synergists can be employed to obtain increased stability using the same concentration of stabilizer or they can be employed to obtain the same stability with less of the stabilizer. Synergists are especially useful in this latter application. Thus, although dilaurylthiodipropionate (DLTDP) is only moderately effective by itself in stabilizing polypropylene, when used with a compound of the present invention a synergist interaction occurs, resulting in a degree of stability totally unexpected from the amount of stabilizers employed. This effect is shown in the following data obtained using the previously described Oven Aging Test.

| Sample No. | Conc. Wt. % | Sample thickness | hours to failure |
|---|---|---|---|
| 1 None | | 62 mil | 2.5 |
| 2 DLTDP | 0.3 | 62 mil | 288 |
| 3 tris(3,5-di-tert-butyl-4-hydroxyphenyl)phosphate | 0.3 | 62 mil | 1768 |
| 4 tris(3,5-di-tert-butyl-4-hydroxyphenyl)phosphate plus DLTDP | 0.1 0.2 | 62 mil | 1600 |

Despite the fact that Sample 4 containing the synergistic mixture contained only one-third as much tris(3,5-di-tert-butyl-4-hydroxyphenyl)phosphate as did Sample 3, it can be seen that it exhibits an unexpectedly long oven aging life. This can only be attributed to a synergistic interaction between DLTDP and the stabilizer, because DLTDP alone, even at 0.3 weight percent (Sample 2), only gave an oven life of 288 hours.

Following are some examples of the synergistic stabilizing compositions of the present invention.

33% — tris(3,5-di-tert-butyl-4-hydroxyphenyl)phosphate
67% — dilaurylthiodipropionate
50% — tris(3-methyl-5-tert-butyl-4-hydroxyphenyl)phosphate
50% — dihexylthiodiacetate
1% — tris(3-ethyl-5-isopropyl-4-hydroxyphenyl)phosphate
99% — diheptylthiodivalerate
99% — tris (3-methyl-5-cyclohexyl-4-hydroxyphenyl)phosphate
1% — di-n-octyl-thiodipropionate
75% — tris(3-methyl-5-(α-methylbenzyl)-4-hydroxyphenyl)phosphate
25% — didecylthiodiacetate
25% — tris(3-methyl-5-(α, α-dimethylbenzyl)-4-hydroxyphenyl)phosphate
75% — diundecylthiodibutyrate
25% — tris(3,5-dicyclohexyl-4-hydroxyphenyl)phosphate 75% — dioctadecylthiodipropionate
80% — tris(3-tert-butyl-5-(α-methylbenzyl)-4-hydroxyphenyl)phosphate
20% — dinonadecylthiodibutyrate
60% — tris(3-tert-dodecyl-5-sec-octadecyl-4-hydroxyphenyl)phosphate
40% — dieicosylthiodipropionate
10% — tris(3,5-di-tert-butyl-4-hydroxyphenyl)phosphate
90% — dilaurylthiodipropionate
90% — tris(3,5-di-tert-butyl-4-hydroxyphenyl)phosphate
10% — dilaurylthiodipropionate
30% — tris(3,5-di-tert-butyl-4-hydroxyphenyl)phosphate
70% — distearylthiodipropionate The above synergistic stabilizer compositions are beneficially employed in any of the previously described organic materials normally susceptible to deterioration due to the effect of oxygen or ozone. In Examples 4 through 27, each of the above synergistic compositions can be substituted for the stabilizing compound of the present invention now shown, resulting in an organic composition of increased resistance to degradation from the effects of oxygen or ozone.

I claim:

1. Natural and synthetic rubber, polyolefins normally susceptible to deterioration due to the effects of oxygen containing a stabilizing quantity of a compound having the formula:

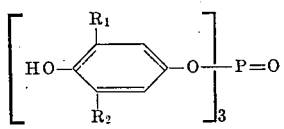

wherein $R_1$ is selected from the group consisting of alpha-branched alkyl radicals containing from three to 18 carbon atoms, alpha-branched aralkyl radicals containing from eight to 18 carbon atoms and cycloalkyl radicals containing from six to 18 carbon atoms; and $R_2$ is selected from the group consisting of alkyl radicals containing from one to 18 carbon atoms, aralkyl radicals containing from seven to 18 carbon atoms, aryl radicals containing from six to 18 carbon atoms and cycloalkyl radicals containing from six to 18 carbon atoms.

2. The composition of claim 1 wherein said compound is tris(3,5-di-tert-butyl-4-hydroxyphenyl)phosphate.

3. The composition of claim 1 wherein said organic material is a polyolefin.

4. The composition of claim 3 wherein said compound is tris(3,5-di-tert-butyl-4-hydroxyphenyl)phosphate.

5. The composition of claim 3 wherein said polyolefin is a polyethylene.

6. The composition of claim 3 wherein said polyolefin is a polypropylene.

7. The composition of claim 6 wherein said compound is tris(3,5-di-tert-butyl-4-hydroxyphenyl)phosphate.

8. The organic material of claim 1 containing additionally a synergistic amount of a synergist having the formula:

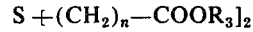

wherein $n$ is an integer from 1 to 5, and $R_3$ is selected from the group consisting of alkyl radicals containing from one to 20 carbon atoms, aryl radicals containing from six to 20 carbon atoms, aralkyl radicals containing from seven to 20 carbon atoms and cycloalkyl radicals containing from six to 20 carbon atoms.

9. The composition of claim 8 wherein said organic material is a polyolefin.

10. The composition of claim 9 wherein said polyolefin is a polyethylene.

11. The composition of claim 9 wherein said polyolefin is a polypropylene.

12. The composition of claim 11 wherein said synergist is dilaurylthiodipropionate.

13. The composition of claim 12 wherein said compound is tris(3,5-di-tert-butyl-4-hydroxyphenyl)phosphate.

14. The composition of claim 8 wherein said synergist is dilaurylthiodipropionate.

15. The composition of claim 14 wherein said compound is tris(3,5-di-tert-butyl-4-hydroxyphenyl)phosphate.

16. The composition of claim 3 wherein said polyolefin is a polymer of an olefin monomer containing from two to four carbon atoms.

17. The composition of claim 16 wherein said compound is tris(3,5-di-tert-butyl-4-hydroxyphenyl)phosphate.

18. The composition of claim 9 wherein said polyolefin is a polymer of an olefin monomer containing from two to four carbon atoms.

19. The composition of claim 18 wherein said compound is tris(3,5-di-tert-butyl-4-hydroxyphenyl)phosphate.

20. The composition of claim 19 wherein said synergist is dilaurylthiodipropionate.

21. A stabilizing composition comprising from 1 to 99 weight percent of a compound of claim 1 and from 1 to 99 weight percent of a synergistic compound having the formula:

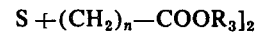

wherein $n$ is an integer from 1 to 5, and $R_3$ is selected from the group consisting of alkyl radicals containing from one to 20 carbon atoms, aryl radicals containing from six to 20 carbon atoms, aralkyl radicals containing from seven to 20 carbon atoms and cycloalkyl radicals containing from six to 20 carbon atoms.

22. A stabilizing composition of claim 22 wherein said compound of claim 1 is tris(3,5-di-tert-butyl-4-hydroxyphenyl)phosphate and said synergistic compound is dilaurylthiodipropionate.

* * * * *